United States Patent
Arasuna et al.

[11] Patent Number: 5,869,799
[45] Date of Patent: Feb. 9, 1999

[54] WELDING GUN CONTROL METHOD

[75] Inventors: Hitoshi Arasuna; Satoru Hirayama, both of Kobe; Kazutsugu Suita; Seiji Suzuki, both of Toyota; Yoshitaka Sakamoto, Nagoya, all of Japan

[73] Assignees: Kawasaki Jukogyo Kabushiki Kaisha, Kobe; Toyota Jidosha Kabushiki, Toyota, both of Japan

[21] Appl. No.: 864,890

[22] Filed: May 29, 1997

[30] Foreign Application Priority Data

Jun. 13, 1996 [JP] Japan .................................. 8-152636

[51] Int. Cl.⁶ .................................................. B23K 11/10
[52] U.S. Cl. .................................... 219/86.7; 219/86.33
[58] Field of Search .............................. 219/86.7, 86.33, 219/86.41, 86.51, 91.1

[56] References Cited

U.S. PATENT DOCUMENTS

| | | | |
|---|---|---|---|
| 4,841,113 | 6/1989 | Hamada et al. | 219/86.41 |
| 5,340,960 | 8/1994 | Takasaki et al. | 219/86.7 |
| 5,449,875 | 9/1995 | Ito et al. | 219/86.7 |
| 5,484,975 | 1/1996 | Itatsu | 219/86.7 |

FOREIGN PATENT DOCUMENTS

| | | |
|---|---|---|
| A 6-312273 | 11/1994 | Japan . |
| A 6-312274 | 11/1994 | Japan . |
| A 7-64615 | 3/1995 | Japan . |

*Primary Examiner*—Clifford C. Shaw
*Attorney, Agent, or Firm*—Oliff & Berridge, PLC

[57] ABSTRACT

Positions where the pair of electrode chips are in contact with each other are regarded as reference positions. Desired starting positions where the tips of the pair of electrodes are slightly apart from the surfaces of a workpiece are determined on the basis of the reference positions X taking into consideration the thickness d of the workpiece. The electrode chips are moved to the desired starting position. The electrode chips are moved at a predetermined low speed until contact positions where the electrode chips come into contact with the workpiece (20). The electrode chips are then moved at a predetermined speed from the contact positions to overshot positions where the workpiece is compressed between the electrode chips.

6 Claims, 4 Drawing Sheets

WELDING GUN CONTROL METHOD

BACKGROUND OF THE INVENTION

The present invention relates to a welding gun control method for controlling a welding gun, such as a spot welding gun, used in metal product manufacturing factories.

DESCRIPTION OF THE RELATED ART

Welding robots have prevalently been used for automatic spot welding in metal product manufacturing factories. The welding robot moves a welding gun sequentially to portions of a workpiece to be welded, holds the workpiece at a portion thereof to be welded between the tips of the electrode chips of the welding gun and supplies a welding current across the electrode chips while the workpiece is compressed between the electrode chips. An appropriate pressure must be applied to the portions of the workpiece to be welded to improve the reliability of welds. However, it is preferable to bring the tips of the electrode chips of the welding gun gently into contact with the surfaces of the workpiece to avoid excessively intensely shocking the workpiece, because, the tips of the electrode chips are worn rapidly, the surfaces of the workpiece are deformed greatly and weld quality is deteriorated if the tips of the electrode chips are brought into contact with the workpiece with intense shocks.

Techniques relating to the control of the electron gun in bringing the electrode chips of the electron gun into contact with the surfaces of a workpiece are disclosed in, for example, JP-A Nos. 6-312273 (Reference 1), 6-312274 (Reference 2) and 7-64615 (Reference 3). The prior art disclosed in Reference 1 determines previously the relation between motor driving current for driving a servomotor for moving the electrode chips of a welding gun and pressure which is applied to the workpiece, moves the tips of the electrode chips to desired operating positions previously determined taking into consideration the thickness of the workpiece and a deflection in an arm supporting the welding gun, and then adjusts the positions of the electrode chips so that a motor driving current corresponding to a predetermined pressure is supplied to the servomotor. The prior art disclosed in Reference 2 corrects the interval between the electrode chips of a welding gun taking into consideration an average amount of wear of the electrode chips so that the interval between the electrode chips remains constant regardless of the wear of the electrode chips resulting from the repetition of a welding cycle. The prior art disclosed in Reference 3 monitors the motor driving current supplied to a servomotor for moving the electrode chips of a welding gun, detecting the positions of the tips of the electrode chips, and decides that the servomotor is loaded excessively by obstruction to the electrode chips by an obstacle if the motor driving current supplied to the servomotor increases before the tips of the electrode chips arrives at set positions determined taking into consideration the thickness of workpiece.

A prior art technique disclosed in Reference 1 determines the desired operating positions of the electrode chips taking into consideration the thickness of the compressed workpiece and the deflection of the arm supporting the welding gun, and corrects the positions of the electrode chips on the basis of the difference between a pressure corresponding to the motor driving current supplied to the servomotor and a set pressure. Since the deflection of the arm to be caused when the workpiece is compressed between the electrode chips is taken into consideration before actually compressing the workpieces and before the arm is deflected, the operating positions of the tips of the electrode chips are advanced further toward the workpiece beyond positions where the tips of the electrode chips come into contact with the workpiece. Accordingly, the electrode chips collide at a relatively high speed against the workpiece and give relatively intense shocks to the workpiece. On the other hand, this prior art controls the welding gun so that the deceleration of the electrode chips is started a sufficiently long distance before positions where the electrode chips come into contact with the workpiece and the electrode chips come into contact gently with the workpiece. However any concrete measures for achieving such control are not mentioned in Reference 1. Accordingly, the prior art disclosed in Reference 1 needs complex control operations to apply an appropriate pressure to the workpiece by correcting the positions of the tips of the electrode chips by a feedback control operation using an actual pressure applied to the workpiece.

A prior art technique disclosed in Reference 2 corrects the interval between the electrode chips of a welding gun taking into consideration an average amount of wear of the electrode chips so that the interval between the electrode chips remains constant regardless of the wear of the electrode chips. However, nothing is described about measures for bringing the tips of the electrode chips into gentle contact with the workpiece and measures for controlling the electrode chips so that the workpiece is compressed between the electrode chips at a predetermined pressure.

A prior art technique disclosed in Reference 3 is capable of detecting the collision of the electrode chips with an obstacle while the electrode chips held at an interval greater than the thickness of the workpiece are being moved through the detection of an abnormal increase in the motor driving current supplied to the servomotor. However, nothing is disclosed in Reference 3 about measures for bringing the tips of the electrode chips into gentle contact with the workpiece and measures for controlling the electrode chips so that the workpiece is compressed between the electrode chips at a predetermined pressure.

Accordingly, the electrode chips cannot be controlled so that the electrode chips come into stable contact with the surfaces of the workpiece without giving intense shocks to the workpiece if different workpieces have different thicknesses, respectively, and the gaps between the electrode chips and different workpieces are different, when pressure to be applied by the electrode chips of a welding gun to the workpiece is controlled by the prior art techniques. The prior art techniques needs complex control operations including a control operation for correcting the projection of the electrode chips to control the electrode chips so that an appropriate pressure is applied to the workpiece.

SUMMARY OF THE INVENTION

Accordingly, it is an object of the present invention to provide a welding gun control method capable of easily controlling a welding gun so that the tips of the electrode chips of the welding gun are brought gently into contact with the surfaces of a workpiece without giving intense shocks to the workpiece regardless of changes in the shape of the workpiece and the electrode chips.

According to one aspect of the present invention, there is provided a welding gun control method for controlling a welding gun which has a pair of electrode chips driven by a motor and holding a workpiece therebetween, and welds the workpiece, said welding gun control method comprising the steps of: inserting a workpiece between the pair of electrode chips spaced from each other; setting, on the basis of reference positions where the pair of electrode chips are in contact with each other, starting positions where the pair of electrode chips are spaced slightly from the workpiece inserted between the electrode chips, and moving at least one of the pair of electrode chips by a motor to move the pair of electrode chips to the starting positions; setting overshot positions where the tips of the pair of electrode chips are advanced toward each other beyond contact positions where the tips of the pair of electrode chips are in contact with the surfaces of the workpiece; and moving at least one of the pair of electrode chips by a motor at a high speed higher than a predetermined speed to move the pair of electrode chips from the contact positions to the overshot positions.

According to the present invention, the reference positions where the tips of the electrode chips are in contact with each other are determined beforehand in a state where any workpiece is not held between the electrode chips, the desired starting positions of the electrode chips where the tips of the electrode chips are separated from each other by a distance corresponding to the thickness of the workpiece, and the positions of the electrode chips are controlled. The movement of the electrode chips to the desired starting positions is controlled in a first control mode in which the electrode chips are moved at the lower speed. The desired starting positions of the electrode chips are determined so that the tips of the electrode chips are not in contact with the workpiece to enable the quick movement of the electrode chips to the starting positions, taking into consideration difference in thickness between different workpieces. The movement of the electrode chips from the desired starting positions to the desired overshot positions is controlled in a second control mode in which the electrode chips are moved at the speed not higher than the predetermined speed, while the variation of the motor driving current supplied to the motor is monitored. The electrode chips are moved toward the desired overshot positions until the arrival of the electrode chips at positions where the electrode chips are in contact with the workpiece and the motor is overloaded is detected from the variation of the motor driving current supplied to the motor. Since the electrode chips come into contact with the workpiece at the low speed, the electrode chips will not give intense shocks to the workpiece. If the tips of the electrode chips are close to the surfaces of the workpiece when the electrode chips are at the desired starting positions, the electrode chips are able to be brought into contact with the workpiece in a short time even if the electrode chips are moved at a low speed. The motor is overloaded when the electrode chips arrive at the overshot positions, and then the motor driving current supplied to the motor is regulated to a motor driving current corresponding to a predetermined pressure. Therefore, an appropriate pressure is applied to the workpiece by the electrode chips. If difference in thickness between different workpieces is small, the starting positions may be positions where the electrode chips are in contact with the workpiece. If the starting positions are so determined, a process of moving the electrode chips at the low speed from the starting positions to the contact positions where the electrode chips come into contact with the workpiece can be omitted, and the electrode chips can be moved at a stretch from the starting positions to the overshot positions at the high speed, which reduces welding cycle time.

An operation for determining the reference positions where no workpiece is inserted between the electrode chips is one of the operations of the welding robot which can selectively be carried out.

Since the operation for determining the reference positions where no workpiece is inserted between the electrode chips is one of the operations of the welding robot which can selectively be carried out, the operation for determining the reference positions can be repeated every several welding cycles, taking into account the amount of wear of the electrode chips, to compensate for a change in the reference positions due to the wear of the electrode chips.

An optimum starting positions can be determined by correcting previously determined starting positions with reference to the distances between the starting positions and the contact positions traveled by the electrode chips.

If the distances between the starting positions and the contact positions are excessively long, the welding cycle takes a long time because the electrode chips are moved at a low speed from the starting positions to the contact positions, and, if excessively short, the electrode chips may come into contact with the workpiece before the electrode chips arrive at the starting positions and may possibly give intense shocks to the workpiece if the workpiece to be welded includes those having a thickness greater than that used for determining the starting positions. According to the present invention, the distance to be traveled by the electrode chips from the starting positions to the contact positions where the electrode chips will come into contact with the workpiece in the succeeding welding cycle is determined by correcting the distance traveled from the starting positions by the electrode chips before the electrode chips came into contact with the workpiece in the preceding welding cycle, the starting positions can be set so that the electrode chips come into contact with a workpiece after traveling an appropriate distance from the starting positions by learning control.

A driving system for moving the electrode chips may include a compliance element. The driving system including the compliance element is able to absorb difference in thickness between different workpieces and to relieve shocks given to the workpiece by the electrode chips when the electrode chips come into contact with the workpiece.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
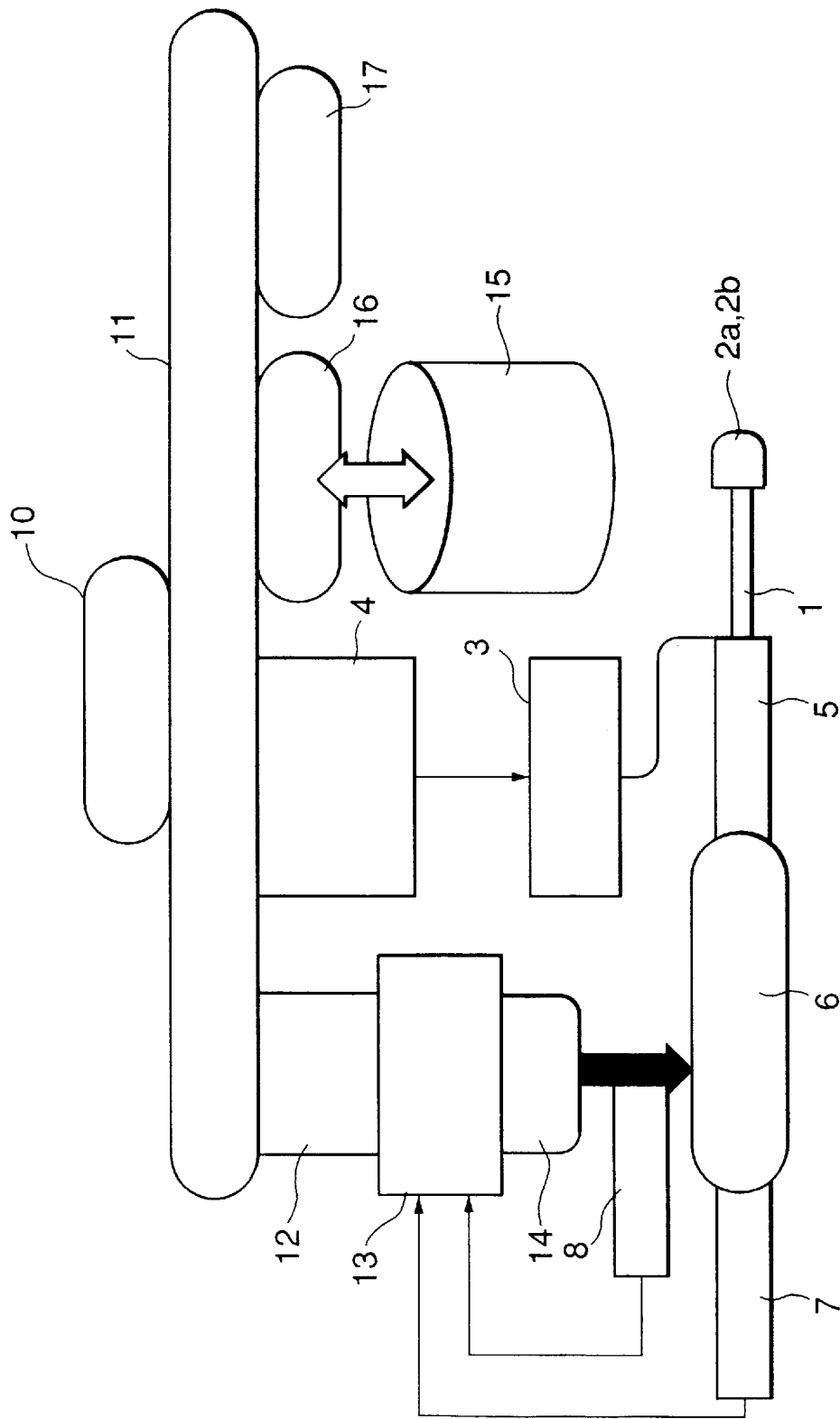
FIG. 1 is a block diagram of a welding gun control system for carrying out a welding gun control method in a first embodiment according to the present invention.

Referring to FIG. 1 showing a welding gun control system for carrying out a welding gun control method in a first embodiment according to the present invention, a welding gun 1 is provided at their forward end with an electrode chip 2a or 2b for spot welding, and a welding current supplied from a power source 3 and controlled by a welding current controller 4 is supplied through the electrode chip 2a, 2b to spot-weld plates 21 and 22 of a workpiece 20. For each electrode chip 2a, 2b, a servomotor 6 drives a driving mechanism 5 to move the welding gun 1. An angular displacement of the output member of the servomotor 6 is detected by an encoder 7, and a motor driving current flowing through the servomotor 6 is detected by a current detector 8. The welding gun 1, the driving mechanism 5, the servomotor 6, the encoder 7 and the current detector 8 are components of a welding robot.

The welding robot comprising a robot unit and a control unit provided with a robot CPU 10. The robot CPU 10 is connected through a system bus 11 to a servo CPU 12 for controlling the welding gun 1. The servo CPU 12 gives a position control signal for controlling the positions of the electrode chip 2a, 2b of the welding gun 1, and a force control signal for controlling pressure to be applied to a workpiece to a pressure controller 13. The pressure controller 13 controls a driver 14 according to control signals given thereto to control the operation of the servomotor 6. The output signal of the encoder 7 representing an angular displacement of the output member of the servomotor 6, and the output of the current detector 8 representing a motor driving current supplied to the servomotor 6 are given to the pressure controller 13 for feedback control.

The robot CUP 10 is connected through the system bus 11 to a welding condition calculating unit 16 for calculating welding conditions on the bases of welding data read from a welding data storage device 15, and an input unit 17 for setting the welding robot in a teaching mode. The welding data storage device 15 stores data about positions of portions of a workpiece 20 (21 and 22) (FIGS. 2A–2C) to be welded, the thicknesses of the portions to be welded and such taught by teaching.

Figure 2:
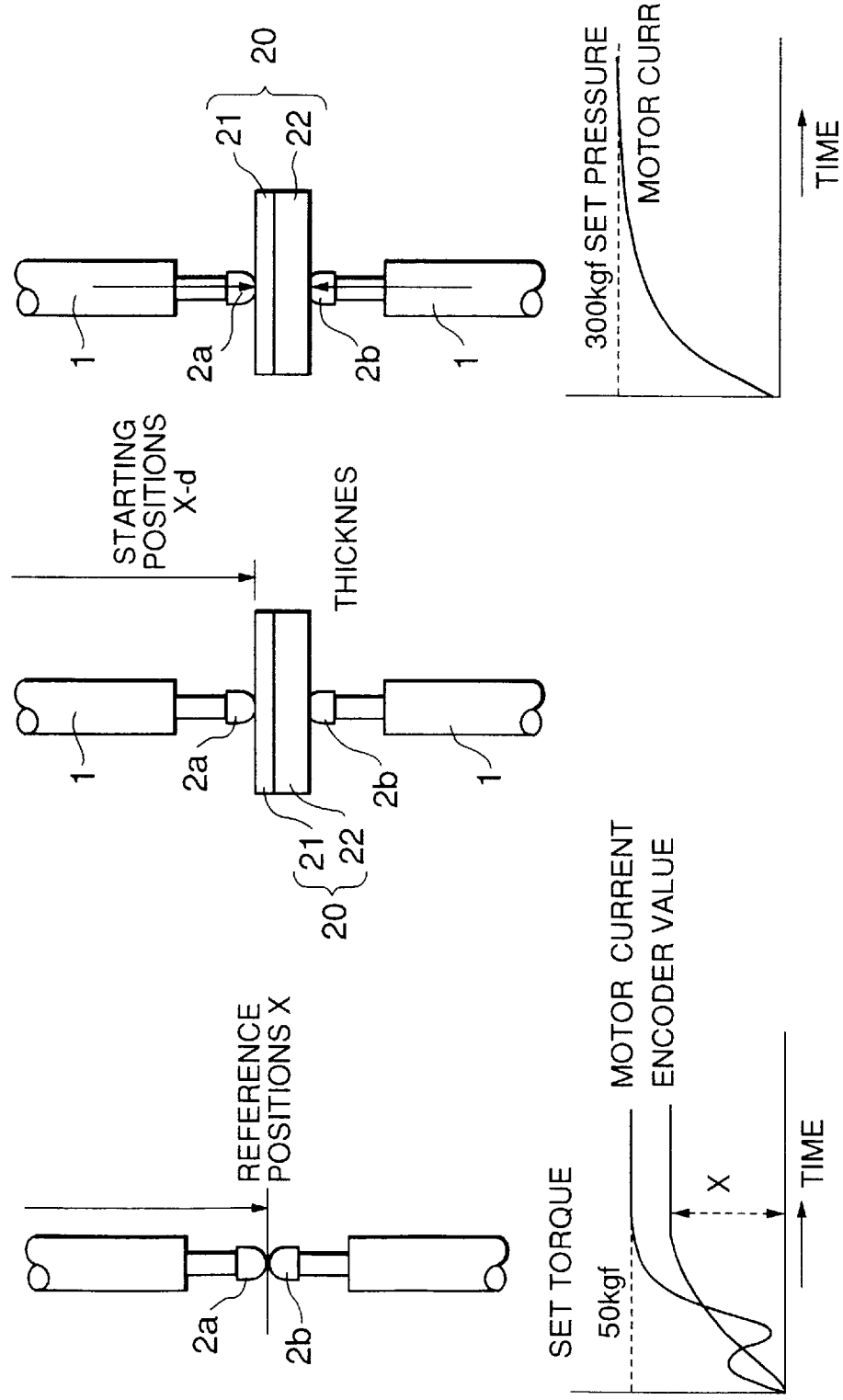
FIGS. 2A, 2B and 2C are typical views and graphs of assistance in explaining a technical idea on which the welding gun control method in the first embodiment according to the present invention.

FIGS. 2A–2C illustrates a technical idea of the welding gun control method in the first embodiment to be carried out by the welding robot of FIG. 1. Referring to FIG. 2A, when the pair of electrode chips 2a and 2b of the welding gun 1 are moved toward reference positions where the electrode chips 2a and 2b come into direct contact with each other, the indication of the encoder 7 combined with the servomotor 6 increases rapidly until the electrode chips 2a and 2b come into contact with each other, and then the indication of the encoder 7 changes slightly after the electrode chips 2a and 2b have come into contact with each other. The motor driving current supplied to the servomotor 6 increases sharply after the electrode chips 2a and 2b have come into contact with each other. Since the arms supporting the welding guns 1, 1 are deflected when the electrode chips 2a and 2b are pressed against each other, it is desirable that the servomotor 7 provides a torque which produces a relatively low contact pressure between the electrode chips 2a and 2b. A set torque, which produces the relatively low contact pressure of, for example, 50 kgf, is determined for the servomotor 7, the relation between the contact pressure applied to the workpiece by the electrode chips 2a and 2b, and the deflection of the arm after the motor driving current has reached a current value corresponding to the set torque is determined beforehand, and reference positions X for the electrode chips 2a and 2b are determined taking into consideration the deflection of the arm. The wear of the tips of the electrode chips 2a and 2b is taken into account when determining the reference positions X.

Referring to FIG. 2B, starting positions X–d are determined taking into account the thickness d of the workpiece 20. The electrode chips 2a and 2b are moved to the starting positions X–d. The thickness d of the workpiece 20 is determined taking into consideration the respective thicknesses of plates 21 and 22 combined to form the workpiece 20, a gap between the plates 21 and 22, the deformation of the plates 21 and 22, and thickness distributions on the plates 21 and 22. When moving the electrode chips 2a and 2b toward the workpiece 20, it is desirable to move the electrode chips 2a and 2b at a maximum speed to positions just before the starting positions X–d and to decelerate the electrode chips 2a and 2b at a maximum deceleration so that the electrode chips 2a and 2b are stopped at the starting positions X–d to move the electrode chips 2a and 2b to the starting positions X–d as quickly as possible. Then a compressing operation is carried out to move the electrode chips 2a and 2b to overshot positions. In an initial stage of the compressing operation, the electrode chips 2a and 2b are advanced gradually toward the workpiece 20. The motor driving current is monitored while the electrode chips 2a and 2b are moved at a very low speed nearly equal to zero toward the workpiece 20. Upon the arrival of the electrode chips 2a and 2b at contact positions where the tips of the electrode chips 2a and 2b come into contact with the surfaces of the workpiece 20, the motor driving current increases sharply.

As shown in FIG. 2C, the electrode chips 2a and 2b are moved further toward the overshot positions at a high speed after the tips of the electrode chips 2a and 2b have come into contact with the surfaces of the workpiece 20, and then the motor driving current is adjusted so that the set pressure is applied to the workpiece 20 by the electrode chips 2a and 2b.

In the operations shown in FIGS. 2A and 2B, the motor driving current and the respective positions of the electrode chips 2a and 2b are monitored to correct the desired starting positions X–d shown in FIG. 2B by a feedback control operation if the thicknesses of different workpieces 20 are distributed in a wide range or the gap between the plates 21 and 22 of the workpieces 20 is greater than that estimated. If the thicknesses of different workpieces 20 are distributed in a very narrow range and the gaps between the plates 21 and 22 of different workpieces 20 are distributed in a very narrow range, the starting positions X–d may be those where the electrode chips 2a and 2b come into contact with the surfaces of the workpiece 20, and the process of advancing the electrode chips 2a and 2b toward the workpiece 20 at a very low speed shown in FIG. 2B may be omitted.

Figure 3:
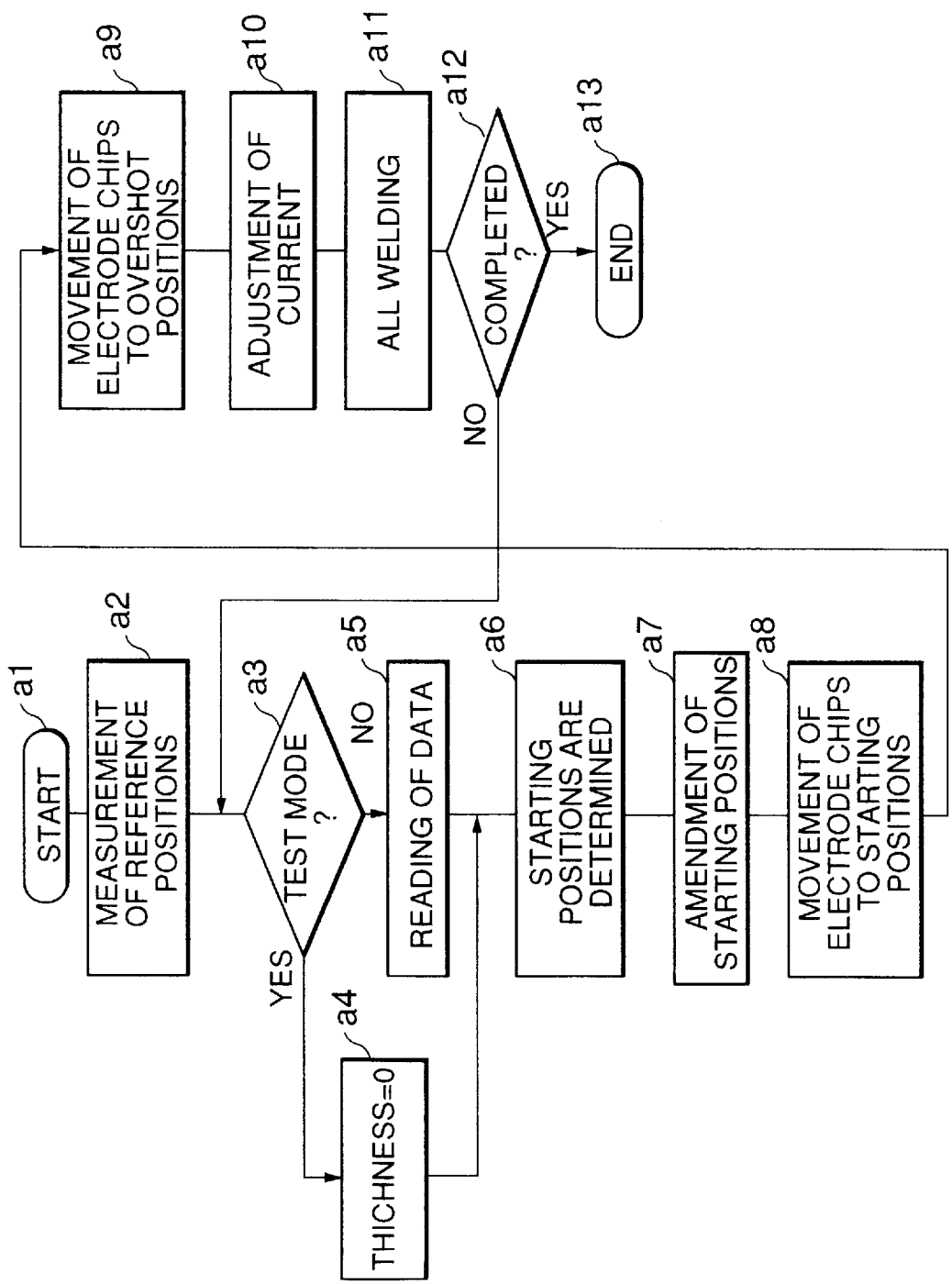
FIG. 3 is a flow chart of a control procedure to be carried out by a CPU included in a welding robot shown in FIG. 1.

Referring to FIG. 3 showing a welding gun control program to be carried out by the robot CPU 10 shown in FIG. 1, the robot CPU 10 starts a control operation in step a1. The reference positions X are measured in step a2. A query is made in step a3 to see if a simulated welding mode, i.e., a test welding mode in which a simulated welding operation is performed without using any workpiece and any welding current, is specified. If the response in step a3 is affirmative, step a4 is executed to set the thickness d of the workpiece 20 to zero. If the response in step a3 is negative, welding data is read from the welding data storage device 15 in step a5, and starting positions X–d where the electrode chips 2a and 2b are separated from each other by a distance corresponding to the thickness d are determined in step a6. Although it is preferable that the electrode chips 2a and 2b are not in contact with the surfaces of the workpiece 20 when the same are moved to the starting positions X–d, respectively, to insure further stable contact, the starting position X–d may be determined so that the electrode chips 2a and 2b are in contact with the surfaces of the workpiece 20 when the same are moved to the starting positions X–d, respectively, if circumstances permit. In step a7, the starting positions X–d are amended for the scattered thicknesses of workpieces and the scattered sizes of gaps in workpieces. In step a8, the electrode chips 2a and 2b are moved to the starting positions X–d. In step a9, overshot positions, i.e., positions where the tips of the electrode chips 2a and 2b are advanced beyond the surfaces of the workpiece 20 in a free state, are determined and the electrode chips 2a and 2b are moved to the overshot positions, respectively. While the electrode chips 2a and 2b are moved from the starting positions X–d toward the overshot positions, the electrode chips 2a and 2b are moved at a low speed lower than a predetermined speed until the same arrives at contact positions where the electrode chips 2a and 2b come into contact with the workpiece 20, and then the electrode chips 2a and 2b are moved at a high speed higher than the predetermined speed from the contact positions to the overshot positions. The arrival of the electrode chips 2a and 2b at the contact positions is detected through the detection of the sharp change of the motor driving current.

In step a10, the motor driving current is adjusted to a predetermined current value corresponding to a predetermined pressure at which the workpiece 20 is to be compressed between the electrode chips 2a and 2b. In step a11, a welding current is supplied across the electrode chips 2a and 2b for welding. A query is made in step a12 to see if the welding operation has been completed. If the response in step a12 is negative, the control procedure returns to step a3 and the welding operation is carried out to weld the next portion of the workpiece 20. If all the portions of the workpiece 20 to be welded are welded, the response in step a12 is affirmative, and the welding gun control program is ended in step a13. The distances traveled by the electrode chips 2a and 2b from the starting positions X–d/2 until the electrode chips 2a and 2b came into contact with the workpiece 20 are fed back to the CPU 10 to use the same as a correction in step a7. If the simulated welding mode is specified, any welding current is not supplied in step a11.

Figures 4A, 4B:
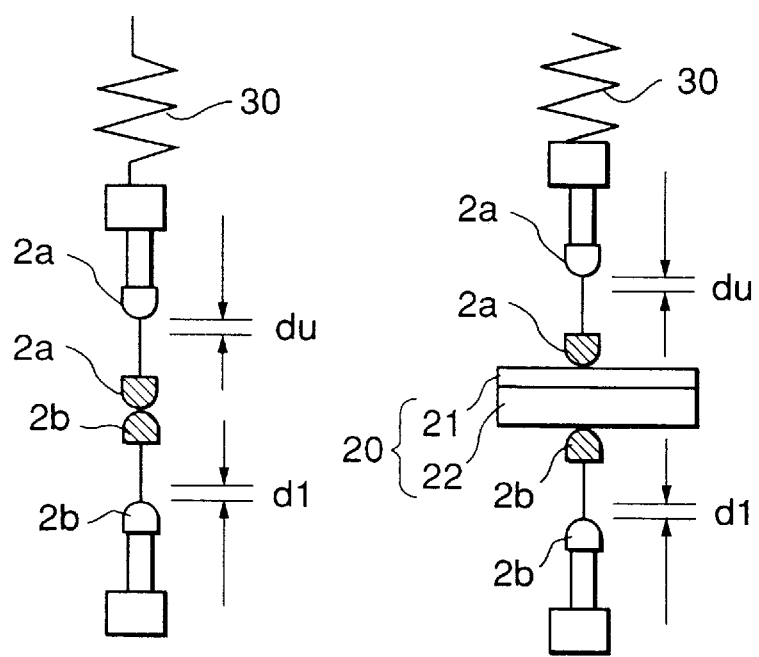
FIGS. 4A and 4B are typical views of assistance in explaining a technical idea on which a welding gun control method in a second embodiment according to the present invention is based.

A welding gun control method in a second embodiment according to the present invention will be described hereinafter with reference to FIGS. 4A and 4B illustrating a technical idea on which the welding gun control method in the second embodiment is based. In FIGS. 4A and 4B, parts like or corresponding to those shown in FIG. 1 are designated by the same reference characters and the description thereof will be omitted to avoid duplication.

A welding gun is provided with a pair of electrode chips 2a and 2b. A mechanical compliance 30 is included in a driving mechanism for driving the electrode chip 2a for movement. When the electrode chips 2a and 2b are brought into contact with a workpiece 20 as indicated by the shaded electrode chips 2a and 2b in FIG. 4A, the mechanical compliance 30 absorbs difference in thickness between different workpieces and difference in size of gaps between plates 21 and 22 of different workpieces. For example, the mechanical compliance 30 is able to absorb the displacement du of the upper electrode chip 2a as shown in FIG. 4A and 4B. If a driving mechanism for driving the lower electrode chip 2b includes a mechanical compliance, not shown, capable of absorbing the displacement dl of the lower electrode chip 2b, increases du and dl respectively in the thicknesses of the plates 21 and 22 of the workpiece 20 can be absorbed. The compliance control operation of the servo CPU 12 may be used instead of the mechanical compliance 30 to absorb such difference in thickness between different workpieces.

Although the present invention been described as applied to controlling the welding gun 1 provided with the electrode chips 2a and 2b which are moved vertically to hold the workpiece 20 for spot welding, the present invention is applicable to controlling a welding gun provided with electrode chips which are moved in any direction other than the vertical direction to hold a workpiece for spot welding.

Although the invention has been described in its preferred form with a certain degree of particularity, obviously many changes and variations are possible therein. It is therefore to be understood the present invention may be practiced otherwise than as specifically described herein without departing from the scope and spirit thereof.

What is claimed is:

1. A welding gun control method for controlling a welding gun which has a pair of electrode chips driven by a motor and holding a workpiece therebetween, and welds the workpiece, said welding gun control method comprising the steps of:

inserting a workpiece between the pair of electrode chips spaced from each other;

setting, on the basis of reference positions where the pair of electrode chips are in contact with each other, starting positions where the pair of electrode chips are spaced slightly from the workpiece inserted between the electrode chips, and moving at least one of the pair of electrode chips by a motor to move the pair of electrode chips to the starting positions;

setting overshot positions where the tips of the pair of electrode chips are advanced toward each other beyond contact positions where the tips of the pair of electrode chips are in contact with the surfaces of the workpiece; and moving at least one of the pair of electrode chips by a motor at a high speed higher than a predetermined speed to move the pair of electrode chips from the contact positions to the overshot positions.

2. The welding gun control method according to claim 1; further comprising a step of moving at least one of the pair of electrode chips by a motor at a low speed lower than the predetermined speed to move the pair of electrode chips from the starting positions to the contact positions.

3. The welding gun control method according to claim 1; further comprising a step of bringing the pair of electrode chips into contact with each other to determine the reference positions for the pair of electrode chips.

4. The welding gun control method according to claim 1, wherein the starting positions are determined by amending the reference positions with the thickness of the workpiece.

5. The welding gun control method according to claim 1, wherein the starting positions are amended by moving distances of the pair of electrode chips from the starting positions to the contact positions in the preceding cycle.

6. The welding gun control method according to claim 1, wherein at least one of the pair of electrode chips is brought elastically into contact with the workpiece when bringing the pair of electrode chips into contact with the workpiece.

* * * * *